May 31, 1960 — R. H. KONSBRUCK — 2,939,063
WHEEL SLIP DETECTION AND CONTROL SYSTEM
Filed April 7, 1954
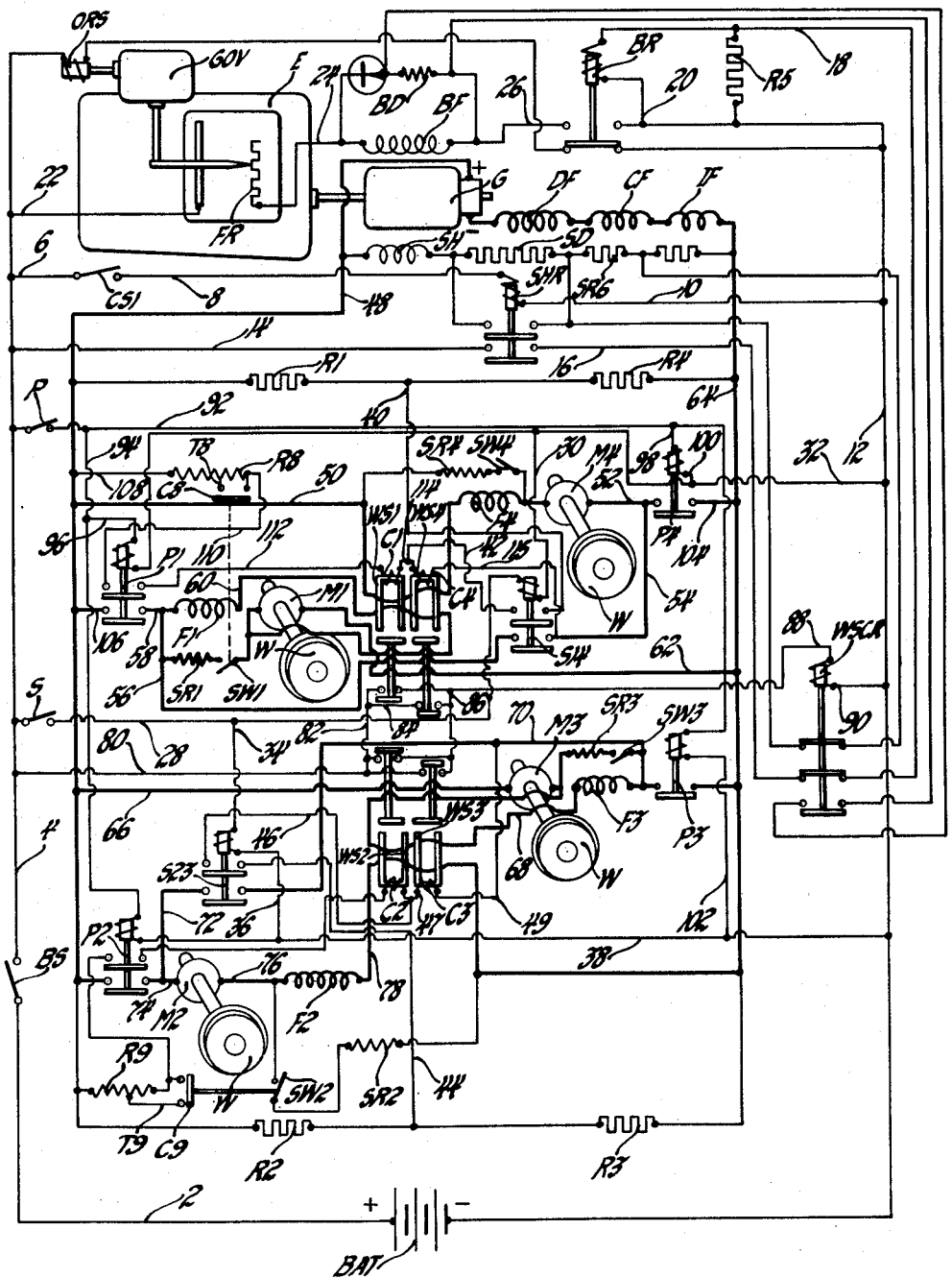
INVENTOR
Robert H. Konsbruck
BY
J. E. Thorpe
ATTORNEY

United States Patent Office 2,939,063
Patented May 31, 1960

2,939,063

WHEEL SLIP DETECTION AND CONTROL SYSTEM

Robert H. Konsbruck, Park Forest, Ill., assignor to General Motors Corporation, Detroit, Mich., a corporation of Delaware Filed Apr. 7, 1954, Ser. No. 421,601

5 Claims. (Cl. 318—52)

The present invention generally relates to generating electric traction and control systems for locomotives and more particularly to control means associated therewith for detecting and eliminating the slippage of traction wheels connected to driving traction motors. The invention is particularly adapted to detect wheel slip occurring when the traction motors are connected across the main generator in parallel or parallel shunt.

It is common practice to provide suitable current relays which act in response to an unbalance of electrical currents in the traction motor power circuits across the main generator to sense and eliminate wheel slip. There is, however, an objection to the wheel slip detection portion of such wheel slip controls. At high motor speeds the differential current relays which sense the unbalance of currents in the traction motor circuits are less sensitive to motor speed changes because the currents flowing through these motor circuits are less due to the increased motor back voltages which occur at the high motor speeds.

The present invention overcomes this objection by using a biasing coil on each of the wheel slip detection relays and increasing the number of such relays to one for each motor. (Normally there is only one wheel slip relay for each two motors.) This biasing coil is connected across the main generator through resistance so that the current flowing therethrough is proportional to main generator voltage. The biasing coil is wound so that the magnetic field generated thereby assists or supplements the magnetic field generated by the current flowing through a lead of one of the motors and opposes the magnetic field generated by current flowing through a lead of the other motor. Since generator voltage is normally highest at high locomotive and reaction motor speeds the decrease in motor speed sensitivity of the wheel slip detection relay due to low current values in the traction motor leads is offset by the biasing effect of the coil connected across the generator.

The use of a generator-biased wheel slip detection relay would be satisfactory for detecting wheel slip of the wheels connected to only one of the traction motors. In other words, in the present wheel slip system a relay is needed for each traction motor and the wheels connected thereto whereas in previous wheel slip control systems one relay served two traction motors. The reason for the additional relays in the present system will be explained later in greater detail in the accompanying specification.

In a locomotive when the traction motors are connected in parallel shunt across the main generator, i.e., with the motor fields shunted by a suitable resistor to reduce motor excitation and back voltage, it has been observed that the wheel slip relays sometimes pick up even though no wheel slip occurs. One explanation for this appears to lie in the way the traction motors are mounted. These motors are usually mounted with one end directly supported on a locomotive axle and the opposite end resiliently supported on a cross member of the truck frame. As the locomotive passes over obstructions and bumps, these motors tend to slightly rotate about the axle causing variations in the back voltages generated by the motors and changes in motor current which have a tendency to make the wheel slip relays pick up when no wheel slip occurs.

The present invention overcomes this difficulty by having portions of the traction motor field leads which are shunted by the usual motor field shunt circuits, act as biasing means for the wheel slip relays. By locating the relays in the motor field circuits in the above manner the inductive characteristics of the fields resist current change in the motor field circuits so that the relays do not unnecessarily pick up when no wheel slip occurs.

A further feature of this invention which should be emphasized is that one of the wheel slip relays of the proposed system is adapted to utilize the wheel slip relay biasing coil normally used when pairs of motors are connected in series across the main generator. In other words, this biasing coil acts to operate the wheel slip relay when the traction motors are connected in series across the main generator and is also utilized to act as the biasing coil connected across the main generator when the traction motors are connected in parallel.

For a more complete understanding of this invention and the objects thereof, reference may be had to the accompanying detailed description and drawing which represents a schematic diagram of this new wheel slip control system.

Referring now to the schematic diagram, a diesel engine E is shown driving a main generator G which is provided with the usual exciting fields including a battery field BF, a shunt field SH, and a plurality of series fields DF, CF, and IF. The engine E is provided with the usual governor GOV which, in combination with load regulator FR, controls the output of the generator G by varying the excitation of the battery field BF. The generator G supplies power to four series type traction motors, M1, M2, M3, and M4, each shown operatively connected to a separate traction wheel W of the locomotive in conventional manner. Power is supplied by power line conductors, shown in heavy lines, extending from the opposite terminals of the generator G and by separate motor branch circuit connections, also shown in heavy lines, which extend between the power lines and serve to connect each motor in series with the normally open contacts of a separate parallel contactor. These parallel contactors are indicated by the reference characters P1, P2, P3, P4 for the respective traction motors M1, M2, M3, and M4.

The parallel contactors P1 through P4 are effective when energized to connect traction motors M1 through M4 in parallel across the main generator. Parallel switch P and the energizing windings of the parallel contactors P1 through P4 are adapted to be connected in circuit with a battery BAT by a battery switch BS so that upon closure of the switches BS and P the contactors P1 through P4 will be energized to connect the traction motors in parallel across the main generator. To connect the motors M1, M4 in series across the main generator, a series contactor S14 is provided. Similarly, to connect the motors M2, M3 in series across the main generator, a series contactor S23 is provided.

The energizing windings for the contactors S14 and S23 are adapted to be connected across the battery BAT by a suitable circuit including the series switch S and the battery switch BS. It will be noted that the fields of the traction motors M1 through M4 which have been designated F1 through F4, respectively, have connected across the terminals thereof shunt circuits including switches SW1 through SW4 and shunting resistors SR1 through SR4, respectively. These shunting circuits are provided so that upon closure of the switches SW1 through SW4 in a well-known manner a portion of the current normally passing through the fields F1 through F4 will be by-passed through resistors SR1 through SR4. In this way the current flowing through motor fields and the excitation thereof is reduced allowing the motors to further accelerate. This field shunting arrangement may be also be used after all of the motors have been connected in parallel across the main generator to enable the motors to further accelerate. The normal transition for the locomotive, then, is as follows:

With the engine E turning the generator G, which is assumed to be excited in a well-known way, and with the switches BS and S closed and switch P open the lower interlock of power contactor S14 will be closed to connect motors M1 and M4 in series across the generator. Similarly, the lower interlock of the power contactor S23 will be closed to connect motors M2 and M3 in series across the main generator. After the speeds of the motors M1 through M4 increase to the point where they can no longer accelerate, further acceleration may be accomplished by closing the switches SW1 through SW4. This partially shunts the respective motor fields and allows the motor speeds to increase. To further accelerate the locomotive, the switches SW1 through SW4 are opened along with switch S and at the same time switch P is closed—all in a well-known manner. Opening of switches SW1 through SW4, of course, removes the shunts around the motor fields. Opening of switch S de-energizes contactors S14 and S23 and causes their interlocks to drop out. Closure of switch P energizes the parallel contactors P1 through P4 to connect all of the traction motors in parallel across the main generator. In order to even further accelerate the locomotive after the motors have been connected in parallel across the main generator the switches SW1 through SW4 are again closed to shunt the motor fields. The switches BS, S, P, and SW1 through SW4 are all opened and closed in a well-known manner which needs no further explanation here since these switches do not form a part of the present invention.

Assuming that the locomotive is running with the motors connected in series parallel across the main generator, i.e., motors M1 and M4 in series and motors M2 and M3 in series across the main generator, if wheel slip should occur in one of the motors one of the wheel slip relays WS3, WS4 will be energized depending on which wheels slip.

The manner in which one of these wheel slip relays is energized will be described in detail later in the specification. Upon energization of one of the wheel slip relays WS3, WS4 a relay WSCR will be energized because the energizing coil of relay WSCR is included in a circuit with the battery BAT and the interlock of each of relays WS3 and WS4. Closure of the interlock of either WS3 or WS4 will connect the energizing coil of WSCR directly across the battery BAT. Energization of relay WSCR causes its lower interlock to close and the middle and upper interlocks thereof to open. Closure of the lower interlock of relay WSCR completes a shunt circuit around the battery field BF and a battery field shunting resistor BD. Opening of the middle interlock of the relay WSCR de-energizes the energizing coil of a relay BR. The coil of relay BR, however, is not immediately de-energized because of the presence of a shunting resistor R5. However, upon de-energization of relay BR the interlock thereof drops to its lower position opening in the upper set of contacts thereof which disconnects the battery field BF from the battery BAT. Since a shunt has been provided around the discharge resistor BD, however, current will tend to circulate through the aforementioned shunt circuit and the battery field BF so that the flux generated thereby gradually decays thereby gradually reducing generator power output to eliminate wheel slip. Closure of the lower contacts of the relay BR energizes an overriding solenoid ORS which overrides the engine governor and starts the load regulator FR moving toward minimum battery field excitation position so that upon the elimination of slip and the reclosing of the upper interlock of relay BR the excitation of field BF will be lower than at which slip first occurred.

It will be noted a switch CS1 connects the energizing coil of a relay SHR across the battery BAT to energize the upper and lower interlocks thereof. Closure of the upper interlock of the relay SHR shunts a resistor SD in series with the shunt field SH across the armature of the generator G. A second resistance SR6 which was normally shunted out by closure of the upper interlock of the relay WSCR is now inserted in the shunt field circuit by opening of the upper interlock of the relay WSCR. This decreases the generator shunt excitation and also tends to reduce the power output of the generator and eliminate wheel slip.

Each of the operations described which has been initiated by the relay WSCR is for the purpose of gradually reducing the power output of the generator so that wheel slip will be eliminated without any unnecessary reduction in the power output of the generator.

Turning now to the wheel slip detection means which forms the primary subject matter of the present invention it will be noted that during parallel connection of the motors across the generator a U-shaped wheel slip relay is provided for each traction motor. As stated above, wheel slip relay WS1 has been provided for slippage of the wheels of traction motor M1, wheel slip relay WS4 corresponds to motor M4, relay WS2 to motor M2, and relay WS3 to motor M3. During series parallel operation of the motors, however, although relays WS1 and WS3 would be operable to detect wheel slip in the motor sets M1, M4 and M2, M3 respectively on a predetermined current differential in the leads of these motors, actually only relays WS1 and WS2 are needed to detect wheel slip with the series parallel connection in motors M1 through M4 across generator G.

One of the leads of traction motor M1 passes through U-shaped magnetizable yokes of relays WS1 and WS4. Similarly, one of the leads of traction motor M4 passes through U-shaped magnetizable yokes of relays WS1, WS4, but in opposite directions so that the magnetic fields generated by current flow through these two leads oppose each other. In addition to using the aforementioned traction motor leads to generate magnetic fields carried by the yokes, wheel slip relay WS1 is provided with a biasing coil C1 and wheel slip relay WS4 is provided with a biasing coil C4. The coils C1 and C4 are connected together and are adapted to be connected in series across the main generator through calibrating resistor R8 by closure of the upper interlock of the contactor P1 and closure of the contactor P4.

In order to help achieve wheel slip detection during series operation of motors M1, M4 across generator G it will be observed that connected in series across the generator G are balanced resistors R1 and R4. A bridge circuit including the upper interlock of the series contactor S14 and coil C4 connects the conductor between resistors R1 and R4 with a conductor extending between the motors M4 and M1 so that the coil C4 may be used to energize the yoke of relay WS4 when the motors M1 and M4 are connected in series across the generator and wheel slip occurs. Biasing coil C1 will, of course, remain de-energized when wheel slip occurs because the interlocks of contactor P1 are open when motors M1 and M4 are connected in series across generator G.

Referring now to motors M2 and M3, it will be noted that wheel slip relays WS2 and WS3 are also provided with U-shaped magnetizable yokes through which a lead of each of the traction motors M2 and M3 pass in opposite directions. Relay WS2 is also provided with a biasing coil C2 and relay WS3 is provided with a biasing coil C3. Coils C2 and C3 are connected together and are adapted to be connected in series across the main generator G through calibrating resistor R9 by closure of the upper interlock of parallel contactor P2 and closure of parallel contactor P3. It will be observed that a second pair of balanced resistors R2 and R3 are connected in series across the main generator. The conductor connecting resistors R2 and R3 is adapted to be connected to the conductor connecting motors M3 and M2 by means of a bridge circuit including the upper interlock of the series contactor S23 and wheel slip relay coil C3.

The operation of this new wheel slip detecting means when the motors M1 through M4 are connected in series-parallel across the main generator G is as follows:

Assuming switches CS1, S and BS to be closed, and switch P and switches SW1 through SW4 to be open, current may flow from the positive side of the battery BAT through a conductor 2, the now closed contacts of switch BS, conductor 4, conductor 6, the closed contacts of switch CS1, a conductor 8, the energizing winding of relay SHR, a conductor 10 and a conductor 12, returning to the negative side of the battery BAT. Energization of relay SHR closes its lower interlocks. Closure of the lower interlocks of relay SHR energizes the relay BR. This is accomplished by current flow from the positive side of the battery BAT through conductor 2, switch BS, conductor 4, a conductor 14, the now closed lower interlock of relay SHR, a conductor 16, the normally closed interlock of relay WSCR, a conductor 18, energizing winding BR, a conductor 20 and conductor 12, returning to the negative side of the battery BAT. As already mentioned, closure of the upper interlock of relay SHR shunts out resistance SD from the generator shunt field circuit. Energization of relay BR opens its lower interlock and closes its upper interlock. Opening of the lower interlock of relay BR de-energizes the circuit including the overriding solenoid ORS. Closure of the upper interlock of relay BR closes the circuit which energizes the battery field BF. This is accomplished by current flow from the positive side of the battery BAT through conductor 2, switch BS, conductor 4, a conductor 22, rheostat FR, a conductor 24, battery field BF, a conductor 26, the now closed upper interlock of battery field relay BR and conductor 12, returning to the negative side of the battery BAT.

Closure of switch S, as already mentioned, energizes the series contactor S14 and this is accomplished by current flow from the positive side of the battery BAT through conductor 2, switch BS, conductor 4, switch S, a conductor 28, energizing winding of series contactor S14, a conductor 30, a conductor 32 and conductor 12, returning to the negative side of the battery BAT.

Similarly, closure of switch S energizes series contactor S23 by allowing current flow from the positive side of the battery BAT through conductotr 2, switch BS, conductor 4, switch S, conductor 28, a conductor 34, the energizing coil of series contactor S23, a conductor 36, a conductor 38 and conductor 12, returning to the negative side of the battery BAT.

Closure of the upper interlock of contactor S14 completes the bridge circuit beginning between resistors R1 and R4 and ending between motors M4 and M1. This circuit includes a conductor 40, the now closed upper interlock of contactor S14, conductors 42 and 114, coil C4 and a conductor 115. A similar bridge circuit extending from between resistors R2 and R3 is completed by closure of contactor S23. This second bridge circuit includes the conductor 44, the now closed upper interlock of contactor S23, conductors 46 and 47, relay coil C3 and a conductor 49.

With series contactor S14 closed, current may be supplied from the main generator G through traction motors M1 and M4. This is accomplished by current flow from the positive side of generator G through heavy current conductor 48, a lead 50 for traction motor M4 which extends through the yokes of relays WS1 and WS4, the field F4, the armature of traction motor M4, a lead 52 for the opposite side of motor M4, a heavy current conductor 54, the now closed interlock of series contactor S14, a heavy current conductor 56, a lead 58 for traction motor M1, the field F1 of traction motor M1, a lead 60 for traction motor M1 which extends through the yokes of relays WS1 and WS4 so that the current flow therethrough is in a direction opposite to the current flow through the lead 50, the armature of motor M1, M1 motor lead 62, and a heavy current conductor 64 leading via series fields IF, CF, DF to the negative side of the generator G.

With series contactor S23 closed, current may also flow through motors M2 and M3 by means of current leaving the positive side of generator G and flowing through heavy current conductor 48, a lead 66 for traction motor M3, the armature of motor M3, a lead 68 for motor M3 which passes through the yokes of relays WS2 and WS3, field F3 of motor M3, a heavy current conductor 70, the now closed lower interlock of contactor S23, a heavy current conductor 72, a motor lead 74 for traction motor M2, the armature of motor M2, a lead 76 for motor M2, field F2 for motor M2, a traction motor lead 78 which extends through the yokes of relays WS2 and WS3 so that the current flow therethrough is opposite to the current flow through lead 68, and heavy current conductor 64, returning to the negative side of generator G.

With the current flow through motors M1 and M4 as described, the magnetic fields generated by the leads 50 and 60 will cancel each other and no influence will be exerted thereby on the armatures of these relays if wheel slip does not occur. If either of the wheels of motors M1 or M4 should slip, however, an unbalanced electrical condition will be set up in the bridge circuit extending between the resistors R1 and R4 and motors M1 and M4. This unbalanced electrical condition will cause current to flow through coil C4. The direction of current flow through coil C4 will depend on whether the wheels connected to motor M1 are slipping or whether the wheels connected to motor M4 are slipping. Sufficient energization of coil C4 will attract the armature of wheel slip relay WS4 and cause its interlock to close. Closure of the interlock of relay WS4 energizes the energizing coil of relay WSCR. This is accomplished by current flow from the positive side of the battery BAT through conductor 2, switch BS, conductor 4, a conductor 80, a conductor 82, a conductor 84, the now closed interlock of relay WS4, a conductor 86, a conductor 88, the energizing coil of relay WSCR, a conductor 90, and conductor 12, returning to the negative side of the battery BAT. Energization of relay WSCR will then operate to eliminate wheel slip in the manner previously described above.

Since coil C3 will be energized by slippage of the wheels connected to motors M2 or M3 in a manner similar to energization of coil C4 when the wheels connected to motors M1 or M4 slip, no further explanation is deemed necessary with respect thereto.

From the above description it may be observed that only relay WS4 is effective to detect slippage of wheels connected to motors M4 and M1 when they are connected in series across generator G. Similarly, only relay WS3 is effective to detect slippage of wheels connected to motors M3 and M2 when they are connected in series across generator G. When the motors M1 through M4 are connected in parallel across generator G, however, all wheel slip relays (WS1 through WS4) are necessary to assure the proper detection of locomotive wheel slippage.

With the motors M1 through M4 connected in parallel across generator G the operation of the new wheel slip control is as follows:

The motors M1 through M4 may be connected in parallel across the main generator G by closure of switch P and opening of switch S. (Switches SW1 through SW4 will also open upon closure of P and opening of S.) Opening of switch S de-energizes the series contactors S14 and S23. Closure of switch P energizes the parallel contactors P1 through P4. Contactor P1 is energized by current flow from the positive side of the battery BAT through conductor 2, switch BS, conductor 4, the now closed parallel switch P, a conductor 92, a conductor 94, a conductor 96, the energizing coil of contactor P1, conductor 32 and conductor 12, returning to the negative side of the battery BAT. Contactor P4 is energized by current flow from the positive side of the battery BAT through conductor 2, switch BS, conductor 4, parallel switch P, conductor 92, a conductor 98, the energizing coil of contactor P4, a conductor 100, conductor 32 and conductor 12, returning to the negative side of the battery BAT. Contactor P2 is energized by current flow from the positive side of the battery BAT through conductor 2, switch BS, conductor 4, parallel switch P, conductor 92, conductor 94, the energizing coil of contactor P2, conductor 38 and conductor 12, returning to the negative side of the battery BAT. Contactor P3 is energized by current flow from the positive side of the battery BAT through conductor 2, switch BS, conductor 4, parallel switch P, the conductor 92, the energizing coil of P3, a conductor 102, conductor 38 and conductor 12, returning to the negative side of the battery BAT.

Energization of contactors P1 and P4 connects motors M1 and M4 in parallel across the main generator. Current may then flow through motor M4 starting from the positive side of the generator G, through heavy current conductor 48, traction motor lead 50 extending through the yokes of relays WS1 and WS4, field F4, the armature for motor M4, traction motor lead 52, the now closed interlock of parallel contactor P4, a heavy current conductor 104 and heavy current conductor 64, returning to the negative side of the generator G. Current may also flow through motors M1 through the positive side of generator G, through heavy current conductor 48, a heavy current conductor 106, the now closed lower interlock of contactor P1, traction motor lead 58, field F1, the traction motor lead 60 extending through the yokes of relays WS1 and WS4, the armature of motor M1, motor lead 62 and heavy current conductor 64, returning to the negative side of the generator G.

Energization of parallel contactor P1 connects the coils C1 and C4 in series across the generator G so that current can flow from the positive side of the generator, through heavy current conductor 48, a conductor 108, the calibrating resistance R8, a conductor 110, the now closed upper interlock of parallel contactor P1, a conductor 112, coil C1, a conductor 114, coil C4, a conductor 115, the heavy current conductor 54, the now closed interlock of parallel contactor P4, heavy current conductor 104 and heavy current conductor 64 returning to the negative side of the generator G.

The relays WS1 and WS4 are set to operate on a relatively high predetermined number of ampere-turns caused by motor current differential, and for low speed, high torque parallel operation of the motors M1 and M4 there will be high current values flowing through the leads 50 and 60. Consequently, if one of the motors M1, M4 should slip the change in ampere-turns caused by the change in current through the lead of the slipping motor would probably energize either of the wheel slip relays WS1, WS4 without the presence of biasing coils C1 and C4 in sufficient time to prevent excessive wheel slip. However, during high speed, low torque operation of the motors M1, M4 the current flowing through the leads 50 and 60 is substantially less than at low speed, high torque and the ampere-turn differential which occurs would not be sufficient to immediately energize the relays WS1 and WS4 and excessive wheel slip would take place. By using biasing coils C1 and C4 whose biasing effect increases as motor speed goes up and motor current goes down (as generator voltage rises), the sensitivity of the wheel slip relays to differences in motor speeds may be maintained. For example, let it be assumed that relays WS1 and WS4 each require a total of 265 ampere-turns differential to pick up. Let it also be assumed that for each 100 generator volts the strength of biasing coils C1 and C4 is equal to 22 ampere-turns. Therefore, the difference in ampere-turns between either biasing coil C1 or C4 and the 265 ampere-turn differential relay pick-up must be furnished by the differential in the current between the two motor leads 50 and 60.

Let it now be assumed that motor M4 slips while generator voltage is at 900. Neglecting differential field action of the generator, the current of motor M1 may be considered 430 amperes at 385 kw. per motor. It is now desired to find out how far the current of motor M4 must drop in order to pick up relay WS4. Since the biasing coil C4 has been set to give 22 ampere-turns boost per 100 generator volts, at 900 volts the biasing coil will have a strength of 198 ampere-turns. The difference of 67 ampere-turns must be made up by motor differential amperes which comes to 430 M4 motor amperes minus 67, or, alternatively, there must be no more than 363 amperes flowing through motor M4 for relay WS4 to pick up.

It can be readily seen that if the wheels connected to motor M1 should slip the biasing coil C4 of relay WS4 would reduce the motor field ampere-turn differential so that the ampere differential at which relay WS4 is set to pick up could not be achieved. The system, therefore, requires that one generator voltage biased relay be used per motor and that these relays be biased by generator voltage in a way that adds ampere-turns to the motor lead ampere-turn differential in relay WS4 during wheel slip of motor M4 and subtracts ampere-turns from the motor lead ampere-turn differential in relay WS1 during wheel slip of the same motor (M4).

In case of slippage of the wheels attached to motor M1, the coil C1 and motor leads 50 and 60 are arranged on the yoke of relay WS1 so that the coil C1 adds ampere-turns to the motor lead ampere-turn differential of the relay. Slippage of wheels attached to motor M1 will not operate relay WS4 because coil C4 will subtract ampere-turns from the motor lead ampere-turn differential of relay WS4. Since motors M2, M3 and their respective wheel slip relays WS2 and WS3 are connected to operate similarly to the operation of motors M1, M4 and relays WS1, WS4, no further description is deemed necessary with respect thereto.

Another feature of this invention worthy of emphasis is the manner of locating the wheel slip relays so that they do not pick up unnecessarily upon sudden momentary changes in the motor armature current when no wheel slip takes place. As already mentioned, as the wheels of the locomotive pass over bumps and uneven portions of track, because of the way they are mounted, each traction motor tends to slightly and sometimes very rapidly rotate back and forth about the axle supporting one end thereof. This slight but rapid rotation causes variations in the motor back voltages and changes in the motor currents which have a tendency to make the wheel slip relays pick up when no wheel slip occurs. In the present invention to overcome this difficulty, the yokes of the wheel slip relays have been located about portions of the traction motor leads which are shunted by the motor field shunt circuits. These motor field shunt circuits include the shunt resistors SR1 through SR4 and switches SW1 through SW4 as shown in the drawing. For example, in the drawing it will be noted that the left-hand side of the motor field shunt circuit for F1 including switch SW1 and resistor SR1 is connected by means of conductor 56 and motor lead 58 to the left-hand side of field F1. It will also be observed that the right-hand side of the aforementioned shunt circuit is connected directly to motor lead 60 after lead 60 has passed through the yokes of both relays WS1 and WS4. In other words, not only does the motor field shunt circuit, when closed, shunt part of the motor M1 armature current around field F1 but also around that portion of lead 60 which passes through the yokes of relays WS1 and WS4. The portions of the leads 50, 68, and 78 for motors M4, M3, and M2, respectively, may be partially shunted in a similar manner by closure of switches SW4, SW3, and SW2, respectively. Locating the yokes of these relays so that motor leads extending therethrough are shunted as described above causes the current which flows through the leads extending through these yokes to also flow through the fields of the traction motors. As previously stated these motor fields have high inductive characteristics which resist any sudden changes in the current flowing through them. Since the currents which flow through the motor fields are the same currents which flow through the motor field leads extending through the wheel slip relay yokes the inductive characteristics of the motor fields also resist any current changes in motor field leads and thereby tend to prevent the relays from picking up upon sudden momentary changes in motor armature current when no wheel slip occurs.

By locating the yokes of the wheel slip relays in the above-described manner there is a certain loss of motor field current differential when the motor fields are shunted. To compensate for this loss of motor field current differential, intermediate taps T8 and T9 are provided on calibrating resistors R8 and R9, respectively, which are closed upon closure of the shunting switches SW1 through SW4. This is accomplished by means of suitable interlocks C8 and C9 connected to switches SW1 and SW2, respectively. When the switches SW1 through SW4 are closed the interlocks C8 and C9 are also closed thereby shunting portions of the calibrating resistors R8 and R9. Shunting portions of resistors R8 and R9 increases the excitation of coils C1 through C4 and the generator biasing effect on wheel slip relays WS1 through WS4. Increasing the generator biasing effect serves to compensate for the loss of motor field current differential when the motor fields are shunted and makes the wheel slip relays WS1 through WS4 substantially equally effective to detect slip throughout the range of parallel and parallel shunt operation of motors M1 through M4.

I claim:

1. In an electric traction and control system including a generator and a pair of traction motors having leads connecting said motors across said generator, means to detect slippage of wheels connected to said motors comprising a relay for each motor using as opposed biasing coils said motor leads, a first supplementary biasing coil connected across said generator and included in one of said relays, a second supplementary biasing coil connected across said generator and included in the other of said relays, said first supplementary coil assisting the bias of one of said leads and opposing the bias of the other of said leads in the one of said relays, said second supplementary coil assisting the bias of the other of said leads and opposing the bias of the one of said leads in the other of said relays whereby the sensitivity of said wheel slip detection means is a function of generator voltage.

2. In an electric traction and control system including a generator and a pair of traction motors having inductive exciting fields therefor, leads connecting said motors including said fields in parallel across said generator, means to detect slippage of wheels connected to one of said motors comprising a relay using as opposed biasing coils portions of said motor leads, and shunt circuits connected to said motor leads around said motor fields closable to decrease the excitation of said motors, said shunt circuits also shunting the portions of the leads used as biasing coils for said relay whereby fluctuations in the currents flowing through said portions of said leads are damped.

3. In an electric traction and control system including a generator and a pair of traction motors having exciting fields therefor, leads connecting said motors including said fields in parallel across said generator, means to detect slippage of wheels connected to one of said motors comprising a relay using as opposed biasing coils portions of said motor leads, and shunt circuits connected to said motor leads around said motor fields closable to decrease the excitation of said motors, said shunt circuits including said portions of the leads used as biasing coils for said relays whereby fluctuations in the currents flowing through said leads are damped, a third biasing coil connected across said generator and included in said relay, said third coil assisting the bias of a portion of one of said leads and opposing the bias of a portion of the other of said leads whereby the sensitivity of said wheel slip detection means is a function of generator voltage.

4. In an electric traction and control system including a generator and a pair of traction motors having inductive exciting fields therefor, leads connecting said motors including said fields in parallel across said generator, means to detect slippage of wheels connected to said motors comprising a pair of relays each using as opposed biasing coils portions of said motor leads, shunt circuits connected to said leads closable to shunt said traction motor fields and decrease the current flow therethrough, said shunt circuits also shunting the portions of the motor leads which act as opposed biasing coils for said relays, a first supplementary biasing coil connected across said generator and included in one of said relays, a second supplementary biasing coil connected across said generator and included in the other of said relays, said first supplementary coil assisting the bias of the one of said leads and opposing the bias of the other of said leads in the one of said relays, said second supplementary coil assisting the bias of the other of said leads and opposing the bias of the one of said leads in the other of said relays whereby the sensitivity of said wheel slip detection means is a function of generator voltage and changes in the current flow through said leads are resisted by the inductive characteristics of said motor fields.

5. In a traction and wheel slip control system, a generating electric power plant, a pair of electric traction motors having driving wheels connected thereto, power connections including switching means for connecting said motors in series or parallel power circuit relation with said power plant, means for reducing the power output of said generating electric power plant, and a wheel slip detecting relay to eliminate slippage of the wheels connected to one of said motors by controlling the power plant output reducing means, said relay having magnetizable means using as opposed biasing means portions of said power connections, an electromagnetic winding on said magnetizable means, switching means for connecting said electro-magnetic winding to act in response to unbalanced electrical conditions between said motors when connected in series relation with said power plant, and switching means to connect said electro-magnetic winding across said generator when said motors are connected in parallel power circuit relation thereacross so that said electro-magnetic winding assists the biasing effect of one of said power connections on the magnetizable means of said relay and opposes the biasing effect of another of said power connections on the magnetizable means of said relay.

References Cited in the file of this patent

UNITED STATES PATENTS

| | | |
|---|---|---|
| 2,543,622 | Edwards et al. | Feb. 27, 1951 |
| 2,591,840 | Lillquist | Apr. 8, 1952 |
| 2,626,362 | Johansson | Jan. 20, 1953 |
| 2,716,209 | Secarea et al. | Aug. 23, 1955 |

FOREIGN PATENTS

| | | |
|---|---|---|
| 703,604 | Great Britain | Feb. 3, 1954 |